(12) United States Patent
Thrane

(10) Patent No.: US 10,045,545 B2
(45) Date of Patent: Aug. 14, 2018

(54) DEVICE AND METHOD FOR AUTOMATICALLY DEFEATHERING SLAUGHTERED POULTRY

(71) Applicant: LINCO FOOD SYSTEMS A/S, Trige (DK)

(72) Inventor: Uffe Thrane, Hammel (DK)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 15/539,110

(22) PCT Filed: Dec. 14, 2015

(86) PCT No.: PCT/EP2015/079632
§ 371 (c)(1),
(2) Date: Jun. 22, 2017

(87) PCT Pub. No.: WO2016/107731
PCT Pub. Date: Jul. 7, 2016

(65) Prior Publication Data
US 2017/0367355 A1 Dec. 28, 2017

(30) Foreign Application Priority Data
Dec. 29, 2014 (DE) .................. 10 2014 019 340

(51) Int. Cl.
*A22C 21/00* (2006.01)
*A22C 21/02* (2006.01)
*A22B 5/08* (2006.01)

(52) U.S. Cl.
CPC .............. *A22C 21/022* (2013.01); *A22B 5/08* (2013.01)

(58) Field of Classification Search
CPC ... A22C 21/00; A22C 21/0061; A22C 21/028; A22C 21/02

(Continued)

(56) References Cited

U.S. PATENT DOCUMENTS 3,402,424 A 9/1968 Brown et al.
3,599,278 A * 8/1971 Crane .................. A22C 21/022
452/89

(Continued)

FOREIGN PATENT DOCUMENTS

DE 2021144 A1 11/1971
WO 2012/175083 A1 12/2012

OTHER PUBLICATIONS

International Search Report dated Mar. 17, 2016 from International Patent Application No. PCT/EP2015/079632 filed Dec. 14, 2015.

(Continued)

*Primary Examiner* — Richard T Price, Jr.
(74) *Attorney, Agent, or Firm* — Sunstone IP

(57) ABSTRACT

The invention concerns an apparatus configured and designed for automatic defeathering of slaughtered poultry, comprising a transport means configured and designed for freely hanging transport of poultry suspended from their feet, in the transport direction along a transport path, and two side cheeks spaced apart and arranged on opposite sides of the transport path and forming a channel, which on their insides facing each other and turned towards the transport path each have means for defeathering the poultry transported through the channel, wherein the defeathering means can be brought into contact with the poultry to be defeathered, which is distinguished in that the apparatus has a stationary means for active support of entry of the poultry between the two side cheeks and the defeathering means arranged thereon, which is arranged in the inlet region E of the poultry into the channel.

13 Claims, 6 Drawing Sheets

Figure 1:
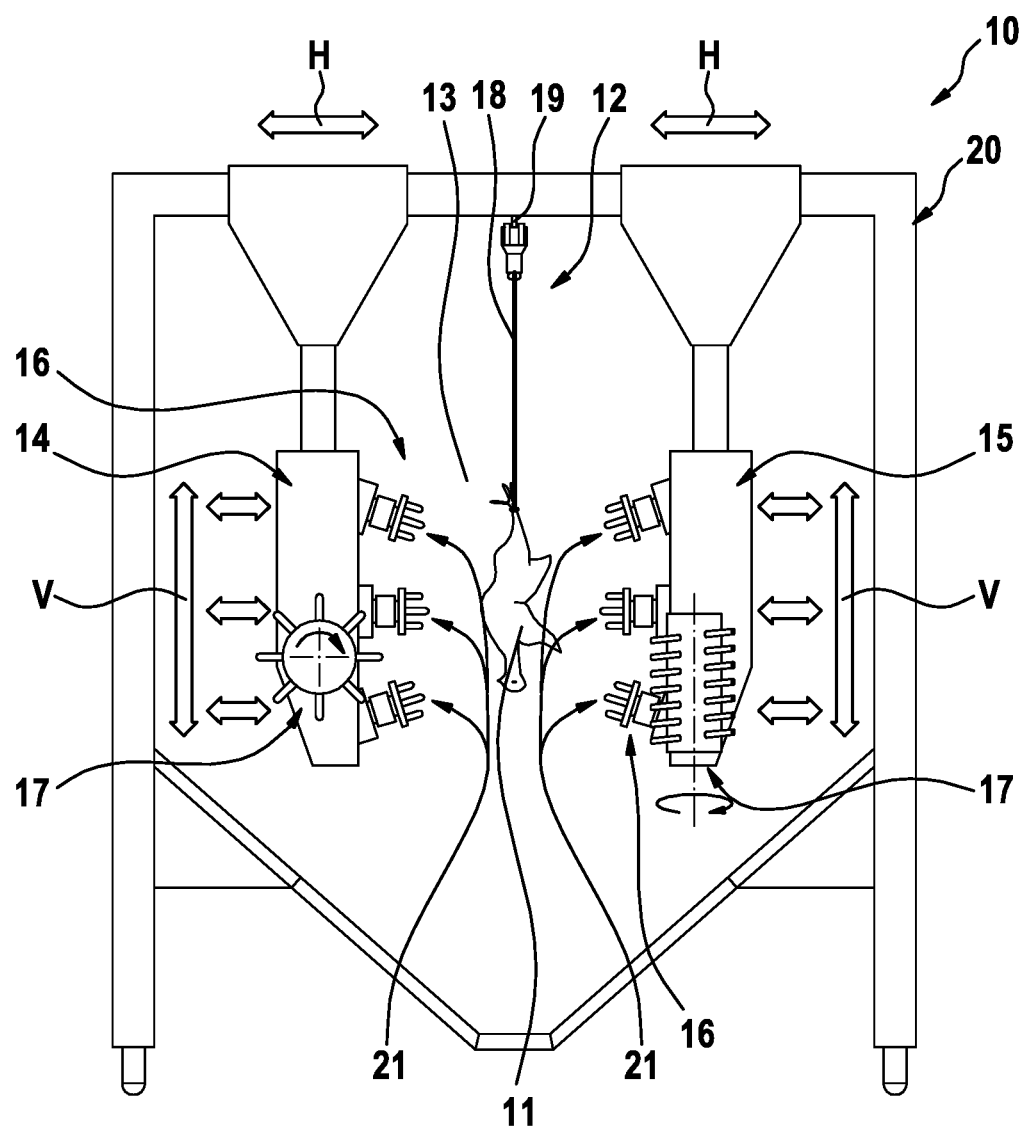

(58) Field of Classification Search
USPC .................................. 452/63, 75, 76, 82–93
See application file for complete search history.

(56) References Cited

U.S. PATENT DOCUMENTS

| | | | |
|---|---|---|---|
| 4,179,772 A | 12/1979 | Harben, Jr. | |
| 4,217,678 A * | 8/1980 | Crawford | A22C 21/022 |
| | | | 452/91 |
| 4,514,879 A * | 5/1985 | Hazenbroek | A22C 21/022 |
| | | | 452/91 |
| 6,001,012 A * | 12/1999 | Ford | A22C 21/02 |
| | | | 452/87 |
| 7,648,412 B2 * | 1/2010 | Kjeldsen | A22C 21/022 |
| | | | 452/88 |
| 8,986,079 B2 * | 3/2015 | Remmer | A22C 21/022 |
| | | | 452/86 |
| 2014/0213163 A1 | 7/2014 | Remmer et al. | |

OTHER PUBLICATIONS

International Preliminary Report on Patentability dated Jul. 4, 2017 from International Patent Application No. PCT/EP2015/079632 filed Dec. 14, 2015.

* cited by examiner

DEVICE AND METHOD FOR AUTOMATICALLY DEFEATHERING SLAUGHTERED POULTRY

The invention concerns an apparatus configured and designed for automatic defeathering of slaughtered poultry, comprising a transport means configured and designed for freely hanging transport of poultry suspended from their feet, in the transport direction T along a transport path, and with two side cheeks spaced apart and arranged on opposite sides of the transport path and forming a channel, which on their insides facing each other and turned towards the transport path each have a means for defeathering the poultry transported through the channel, wherein the defeathering means may be brought into contact with the poultry to be defeathered.

The invention furthermore concerns a method for automatic defeathering of slaughtered poultry, comprising the steps: freely hanging transport of the poultry suspended from their feet, in the transport direction T along a transport path by means of a transport means; defeathering of the poultry during transport of the poultry along a channel formed by two side cheeks spaced apart from each other and arranged on opposite sides of the transport path, by means of defeathering means arranged on the insides of the side cheeks, in that the defeathering means come into contact with the poultry on transport of the poultry through the channel.

Such apparatuses and methods are used in the poultry processing industry in order to defeather slaughtered poultry. For this the slaughtered poultry are suspended from their feet or legs and transported through the channel oriented vertically downwards. On entry into the channel, the defeathering means arranged on both sides of the channel engage in the feathers of the poultry. The poultry are usually transported continuously through the channel along the transport path. The poultry pass the defeathering means over the length of the channel. In order for the defeathering means to come into contact with the poultry to be processed, the channel is formed narrow according to the size of the poultry. Because the poultry are suspended from their feet and transported freely hanging, threading into the narrow channel becomes difficult since at their free head end, on contact with the defeathering means inside the channel, the poultry birds are deflected against the transport direction. Due to the defeathering process, the poultry are held back against the transport direction or actively pushed against the transport direction, whereby they can be lifted out of the transport means. The problem furthermore arises that the poultry are moved so far up that they are moved partially or fully out of engagement with the defeathering means, whereby the efficiency of the defeathering is significantly reduced.

To support the threading of the poultry into the apparatus and the conveying of the poultry within the apparatus, attempts have been made in the prior art to arrange guide rails in front of the channel inlet region, which taper in the transport direction to a width which corresponds approximately to the width of the spacing of the side cheeks. However, said problems could not be eliminated in this way. Furthermore, attempts have been made to arrange the two side cheeks of the apparatus slightly convergent. In other words, in the known solutions the spacing of the two side cheeks in the poultry inlet region is larger than in the outlet region, in order to simplify the insertion or entry of the poultry into the channel. This known arrangement however leads to a reduction in the performance of the apparatus, since because of the enlarged spacing of the side cheeks, not all defeathering means come into engagement with the poultry over the entire length of the channel.

The invention is therefore based on the object of creating a simple and powerful apparatus for automatic defeathering of slaughtered poultry, which guarantees an improved infeed of the poultry between the side cheeks and the defeathering means. The object furthermore consists of proposing a corresponding method.

This object is achieved by an apparatus with the features cited hereinbefore, in that the apparatus comprises a stationary means for active support of the entry of the poultry between the two side cheeks and the defeathering means arranged thereon, which means is arranged in the entry region of the poultry into the channel. By the provision of a stationary means in the channel inlet region, i.e. immediately in front of the channel in the transport direction T, a simple and reliable support is created for the insertion or pushing in of poultry between the side cheeks. With the configuration according to the invention, an automatic infeed of poultry into the channel is possible while protecting the product.

Preferably the means for active support of entry of the poultry between the two side cheeks is configured and designed to apply a mechanical force component in the transport direction T of the poultry. This means that on entry between the side cheeks, the poultry are gripped by the means and thus given an active and mechanical impulse in the transport direction T, to facilitate insertion of the poultry. The term "gripped" in this context means that the means for active support of entry of the poultry between the two side cheeks comes into active connection of the poultry and hence exerts a force component on the poultry.

A preferred refinement of the invention is distinguished in that the means for active support of the entry of the poultry between the two side cheeks is configured and designed to apply a force component which is directed vertically downwards. Thus, the vertical extension of the poultry bodies is supported, so that on entry between the side cheeks and the defeathering means, the poultry can come into contact with the defeathering means over their entire length. Furthermore, the vertically downwardly directed force component ensures that the poultry are held securely in the shackles and in particular not pushed up out of these, in particular on an impulse against the transport direction T. Furthermore, the configuration according to the invention causes the poultry to come always into contact with all defeathering means, whereby the efficiency of the defeathering is improved.

Suitably the side cheeks are arranged and oriented parallel throughout, and on their insides have several stationary defeathering heads which are arranged to be driven in rotation as defeathering means. Because of these stationary defeathering heads which do not travel with the poultry in the transport direction T, an effective defeathering can be performed over the entire length of the channel. Because the channel is formed with the same width throughout so that the side cheeks run parallel throughout, all defeathering heads arranged over the entire length of the channel are brought into engagement with the poultry in the same even manner, so that an increased performance is achieved with better infeed of the poultry.

Advantageously, the means for active support of the entry of the poultry between the two side cheeks comprises at least two rotational bodies driven in rotation and arranged on opposite sides of the transport path. The two opposing rotational bodies may be formed the same or differently. The two rotational bodies forming the means are configured and designed to come into simultaneous contact with the poultry to be defeathered. The rotation of the rotational body exerts the force component onto the poultry in the transport direction T and/or in the direction oriented vertically downwards.

A preferred refinement of the apparatus according to the invention is characterised in that the rotational bodies can be driven about rotation axes oriented vertically and/or horizontally. One rotational body or two or more rotational bodies may be arranged on each side of the transport path. The orientation of the rotation axes may be the same or different. By rotation of the rotational bodies about the vertical rotation axis, a maximum force component can be generated in the transport direction T. By rotation of the rotational bodies about the horizontal rotation axis, a maximum force component can be generated in the vertical direction. Evidently the rotation axes may also be tilted at an angle other than the vertical or horizontal alignment, and thus generate force components in different directions.

Advantageously the rotational bodies have either a cylindrical form or a conical form. Thus, in a particularly simple and effective manner, an impulse may be generated onto the poultry in the transport direction T and/or in the direction oriented vertically downwards. Also, such rotational bodies are particularly simple and economic to produce.

In a particularly preferred embodiment of the apparatus according to the invention, all rotational bodies have flexible push elements in the region of their casing surface such that the poultry birds can be gripped individually in succession, firstly by means of rotation of the rotational body and secondly by the push elements, and pushed into the channel between the defeathering heads. With the flexible push elements, for example fingers or lugs made of rubber or similar, the force component generated by means of the rotation can be transmitted to the poultry directly and safely.

Preferably the drive speed in the transport direction T of the means for active support of entry of the poultry between the two side cheeks is the same as or greater than the drive speed of the transport means. In other words, the impulse on the poultry immediately in the transition region into the channel takes place at the same speed as or slightly faster than the speed at which the poultry are transported through the channel suspended from the shackles.

A preferred refinement is characterised in that the means for active support of entry of the poultry between the two side cheeks may be controlled independently of the transport means. In other words, because of firstly the stationary arrangement of the means for active support of entry of the poultry between the two side cheeks, and secondly the independence of the controls, there is no need for a temporal and/or position-related matching of the controls between the activation of the means for active support of entry of the poultry bodies between the two side cheeks and the drive speed of the transport means. For example, the means for active support of entry of the poultry between the two side cheeks and the defeathering means arranged thereon may be driven permanently with constant rotation, irrespective of the drive speed of the transport means. This makes production and operation of the device simpler and more favourable.

The object is also achieved by a method with the steps cited hereinbefore, in that on entry between the two side cheeks and the defeathering means arranged thereon, each poultry bird is actively supported by a means located stationarily in the inlet region E of the poultry into the channel.

Preferably, the poultry are actively supported on entry between the two side cheeks in that, using the means, a mechanical force component is applied to the poultry in the transport direction T of the poultry and/or directed vertically downwards. Each poultry bird is thus stretched downwards immediately before entry into the channel and/or pressed into the channel in the stretched position.

Advantageously the means for active support of entry of the poultry between the two side cheeks is controlled independently of the transport means. This means that for process control, there is no need for a forced dependence or synchronisation between the means for pulling and/or pushing and the transport means, whereby a flexible and secure process control is guaranteed.

Further advantages arising in connection with the method according to the invention have already been described in connection with an apparatus according to the invention which is particularly suitable for performance of the method, so in order to avoid repetition, reference is made to the corresponding passages.

Figure 2:
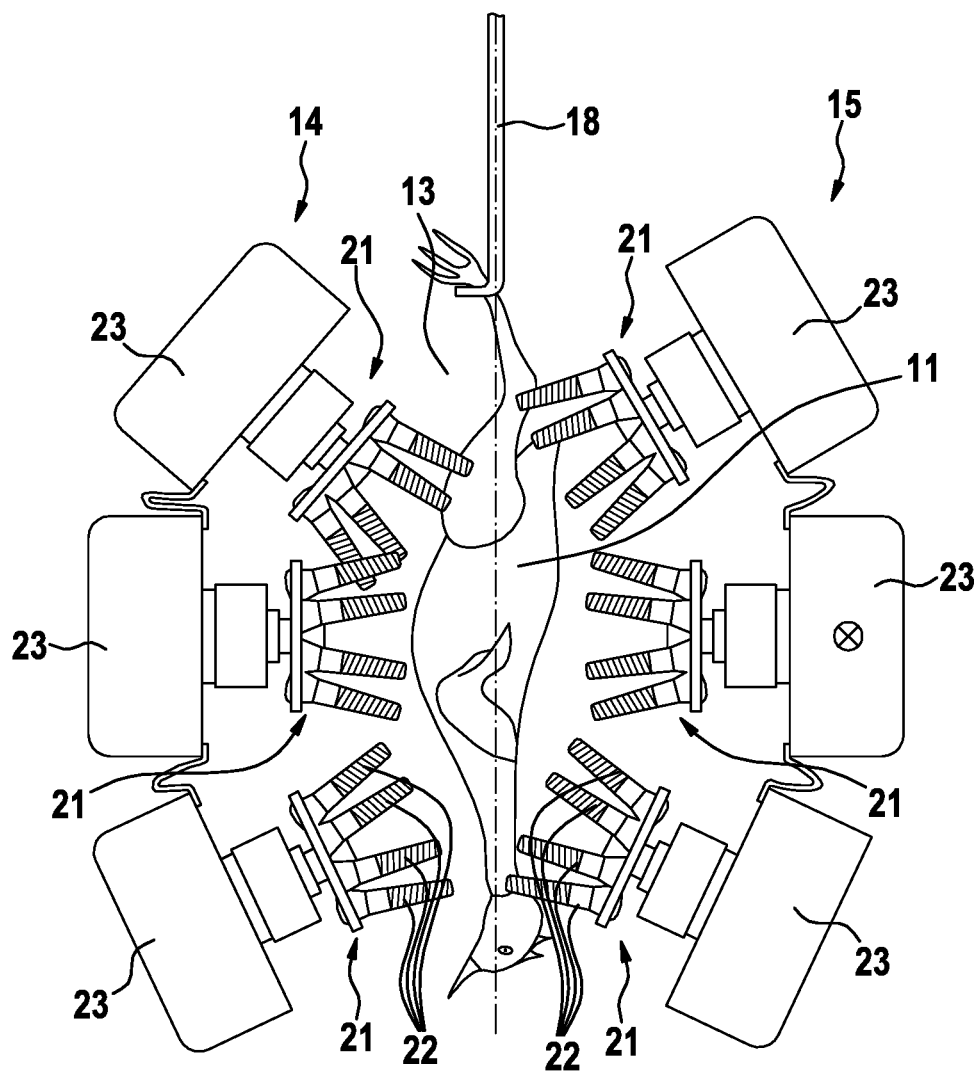
Figure 3:
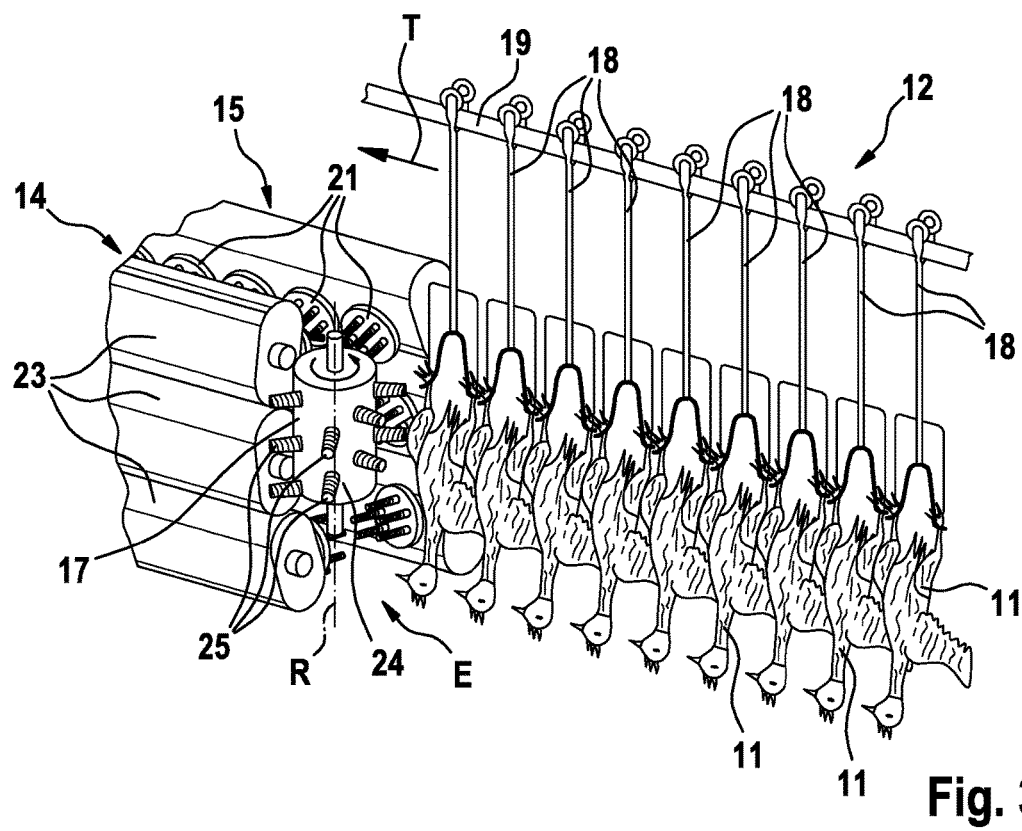
Figure 4:
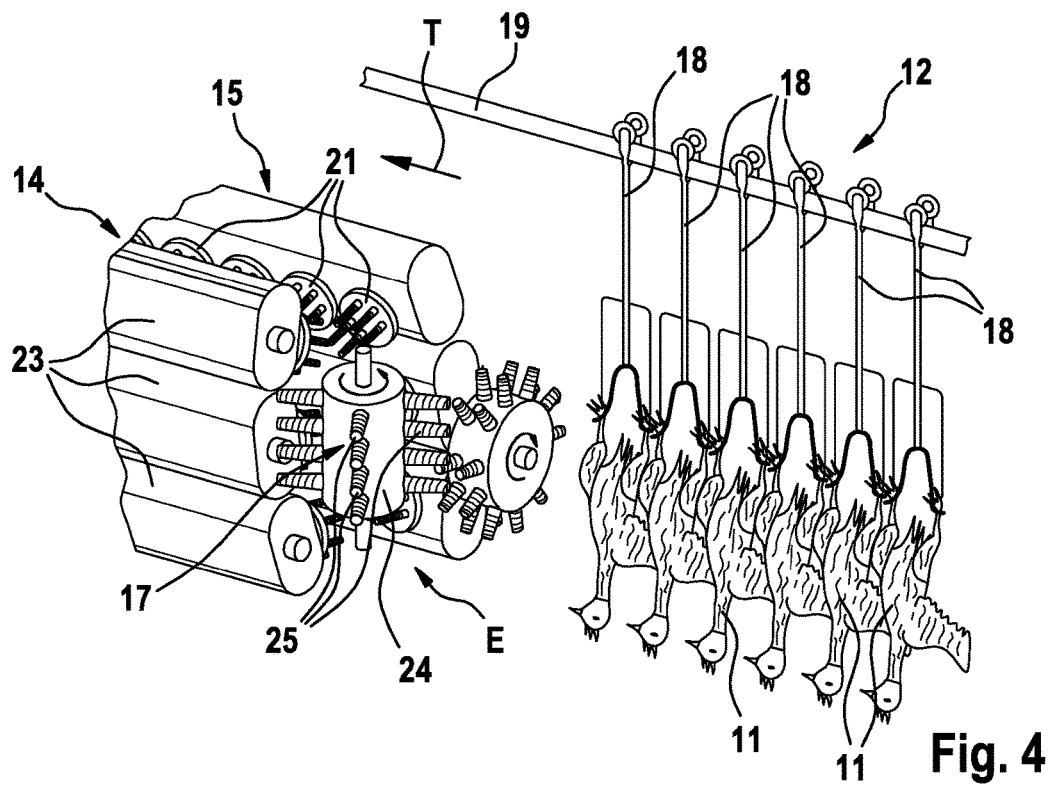
Figure 5:
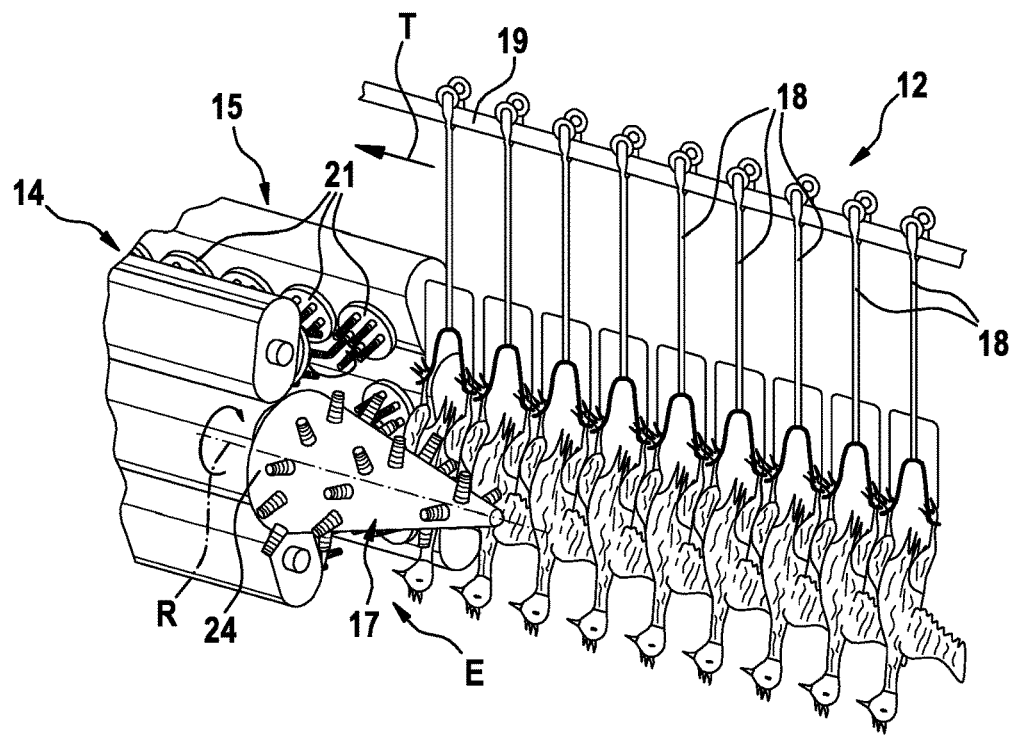
Figure 6:
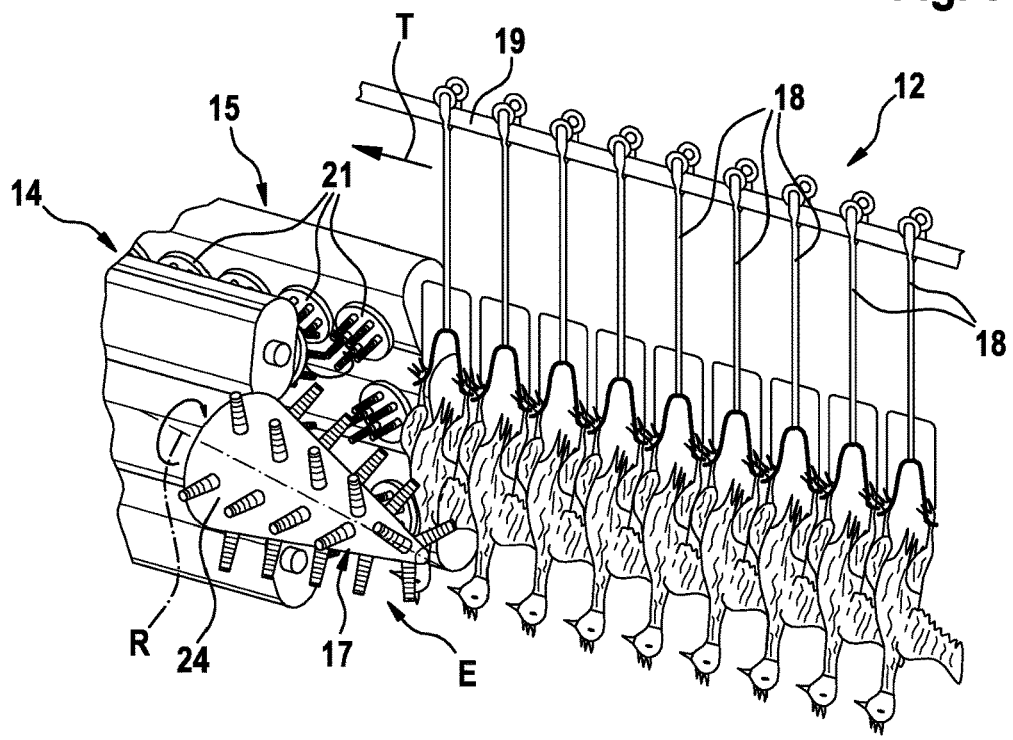
Figure 7:
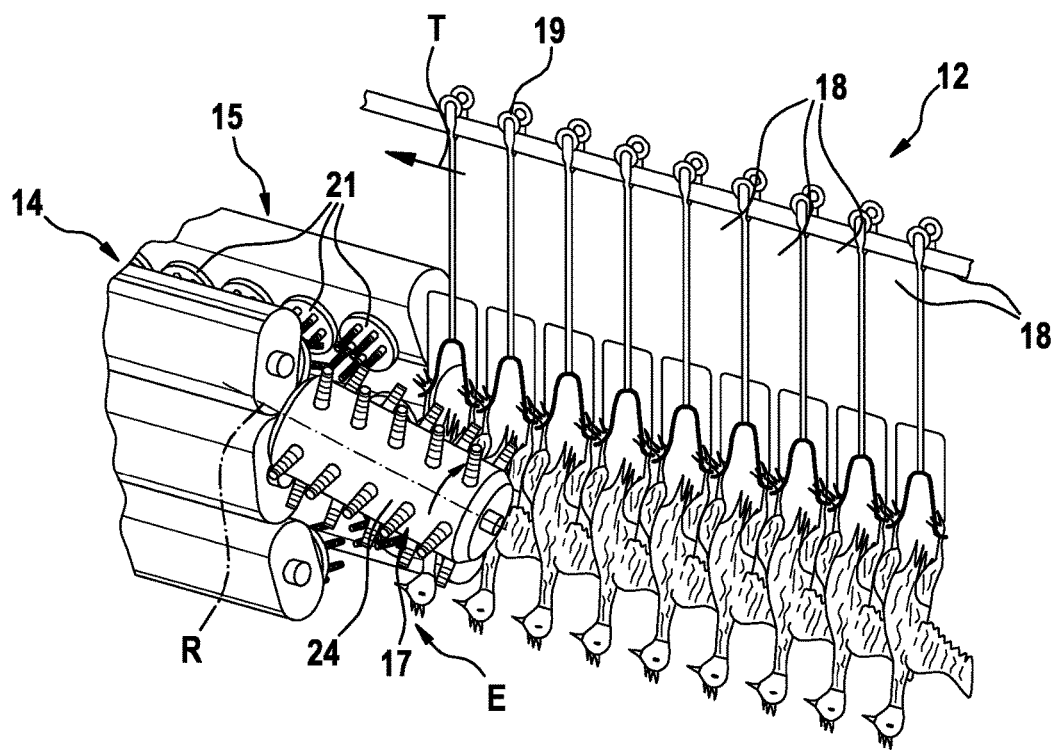
Figure 8A:
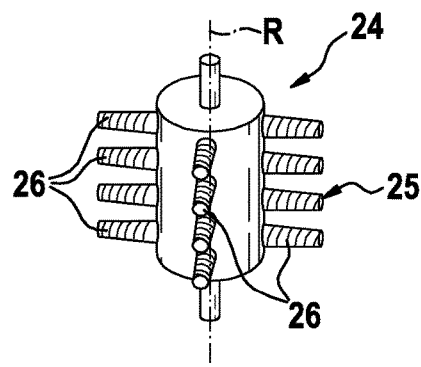
Figure 8B:
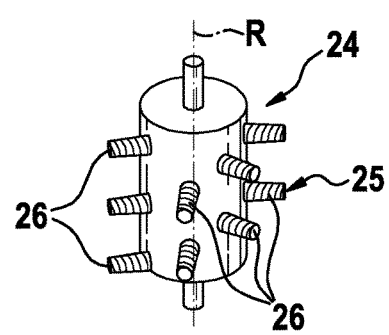
Figure 8C:
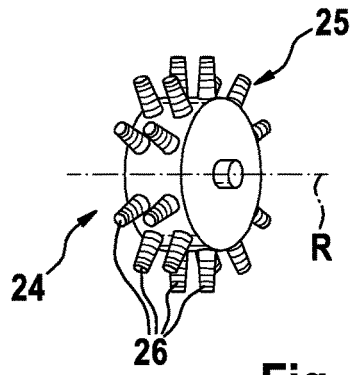
Figure 8D:
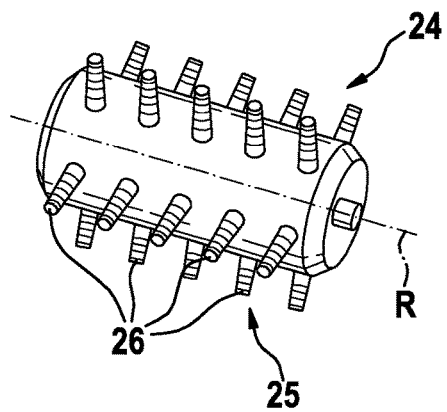
Figure 8E:
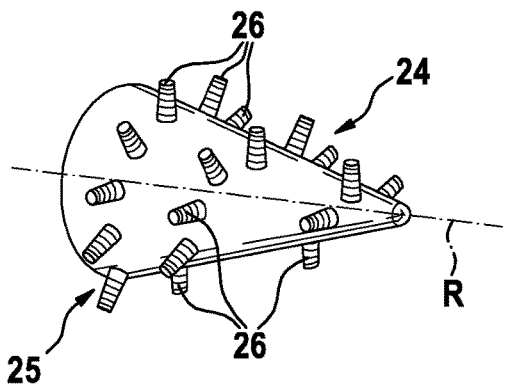
Figure 8F:
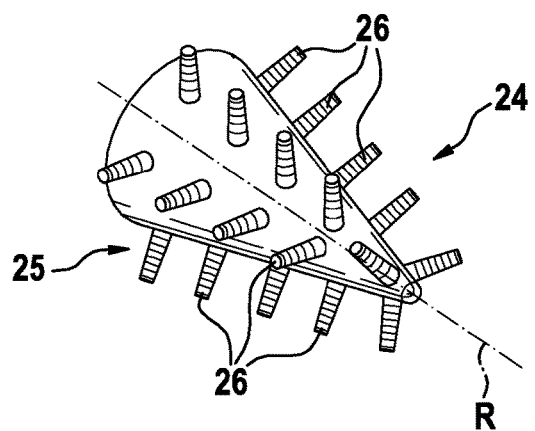

Further suitable and/or advantageous features and refinements of the invention arise from the subclaims and the description. Particularly preferred embodiments of the apparatus according to the invention are explained in more detail with reference to the enclosed drawings. The drawings show:

FIG. 1 a diagrammatic depiction of an apparatus according to the invention, in front view with side cheeks in the opened standby position, FIG. 2 a diagrammatic depiction of the side cheeks carrying the defeathering means, in front view in the working position, FIG. 3 a first embodiment of the stationary means for active support of entry of the poultry between the two side cheeks and the defeathering means arranged thereon, FIG. 4 a further embodiment of the stationary means for active support of entry of the poultry between the two side cheeks and the defeathering means arranged thereon, FIG. 5 a further embodiment of the stationary means for active support of entry of the poultry between the two side cheeks and the defeathering means arranged thereon, FIG. 6 a further embodiment of the stationary means for active support of entry of the poultry between the two side cheeks and the defeathering means arranged thereon, FIG. 7 a further embodiment of the stationary means for active support of entry of the poultry between the two side cheeks and the defeathering means arranged thereon, and FIG. 8 *a* to *f*) a selection of different rotational bodies.

The apparatus shown in the drawing serves for plucking or defeathering slaughtered poultry, namely chickens. The invention is however also suitable for plucking and defeathering other poultry e.g. ducks, geese.

FIG. 1 shows an apparatus 10 which is configured and designed for automatic defeathering of slaughtered poultry 11. The apparatus 10 comprises a transport means 12 which is configured and designed for the freely hanging transport of poultry 11 suspended by their feet, in the transport direction T along a transport path. The apparatus 10 furthermore comprises two side cheeks 14, 15 spaced apart and arranged on opposite sides of the transport path and forming a channel 13, which on their sides facing each other and turned towards the inside of the transport path each have means 16 for defeathering the poultry 11 transported through the channel 13, wherein the defeathering means 16 can be brought into contact with the poultry 11 to be defeathered.

This apparatus 10 is distinguished according to the invention in that the apparatus 10 has a stationary means 17 for active support of entry of the poultry 11 between the two side cheeks 14,15 and the defeathering means 16 arranged thereon, which is arranged in the inlet region E of the poultry 11 into the channel 13. The stationary means 17 for active support of entry of the poultry 11 between the two side cheeks 14, 15 may comprise one element, two or more elements, and is arranged immediately in front of the channel 13 in the transport direction T, so that on transport in the transport direction T, the poultry 11 first come into contact with the means 17 for active support of entry of the poultry 11 between the two side cheeks 14, 15 before they enter the channel 13, in that they are pushed by the means 17 in the transport direction T.

The features and refinements described below either alone or in combination with each other constitute preferred embodiments. It is expressly pointed out that features summarised in the claims and/or description or described in a common embodiment may also refine the device 10 described above functionally independently.

The apparatus 10 shown in FIG. 1 has a so-called overhead conveyor as a transport means 12. An overhead conveyor or roof conveyor allows the vertically oriented poultry 11 to be transported with their heads hanging down. The poultry 11 can thus be transported suspended by their feet or legs in shackles 18. A plurality of such shackles 18 is arranged on the preferably endless conveyor element 19, for example a conveyor chain. The conveyor element 19 can be driven by a drive means (not shown) and controlled by means of a control unit (also not shown) in relation to drive speed.

The apparatus 10 in the embodiment shown has a frame 20 on which the transport means 12 is arranged. The side cheeks 14, 15 are also arranged on the frame 20, namely with the possibility of a vertical (see arrow V) and a horizontal (see arrow H) adjustment of the side cheeks 14, 15 to move the side cheeks 14, 15 from the standby and maintenance position (see FIG. 1) into a working position (see e.g. FIG. 2) and back, and to adjust the apparatus 10 to different poultry sizes. On the insides of the side cheeks 14, 15 are arranged preferably several rows, in the embodiment shown three, of the means 16 for defeathering the poultry bodies 11, which extend over almost the entire length of the channel 13.

The means 17 for active support of entry of the poultry 11 between the two side cheeks 14, 15 is configured and designed to apply a mechanical force component in the transport direction T of the poultry 11. Alternatively or cumulatively, the means 17 for active support of entry of the poultry 11 between the two side cheeks 14, 15 is configured and designed to apply a vertically downwardly directed force component. Each force component in itself facilitates the introduction or entry of the poultry 11 into the channel 13. The combination of force components is particularly preferred. The force components describe an active mechanical impulse on each individual poultry bird 11 which passes the inlet region E, and pushes said poultry bird in virtually stretched fashion into the channel 13.

The side cheeks 14, 15 may be oriented convergent in the transport direction T, namely only in inlet region E or over the entire length of the channel 13. The side cheeks 14, 15 may also run only substantially parallel to each other. Preferably the side cheeks 14, 15 are arranged and oriented parallel to each other throughout. On each of their insides are mounted several stationary defeathering heads 21 which can be driven in rotation as defeathering means 16. This means that in the working position i.e. during processing, the defeathering heads 21 are fixed in location and do not travel with the poultry 11. The defeathering heads 21 are a type of rotating disc with axially protruding fingers 22 or similar made of rubber or a comparable flexible material. Several defeathering heads 21 are arranged in succession in a row. Preferably three rows of such defeathering heads 21 are provided below each other in order to pluck the feathers of the poultry bird 11 over the entire body. The defeathering heads 21 may preferably be driven in rotation. The drive can take place via individual drives. Preferably a common drive is provided for each row. The position, in particular the tilt of the defeathering heads 21 may be designed to be individually adjustable. The side cheeks 14, 15 may be continuous side walls. Preferably however, depending on the number of rows of defeathering heads 21, individual bars 23—in this example three bars 23—form one side cheek 14, 15. The bars 23 of a side cheek 14, 15 are preferably configured adjustable in their position and relative to each other.

The means 17 for active support of entry of the poultry 11 between the two side cheeks 14, 15 comprises at least one rotational body 24, preferably however at least two rotational bodies 24 which can be driven in rotation, and are arranged on opposite sides of the transport path. Preferably one rotational body 24 is arranged on each side of the channel 13, and together these form the means 17. The two rotational bodies 24 may be configured identically or differently. In any case, the rotational bodies 24 are arranged in front of the channel 13 in the transport direction T and are configured and designed so they can be brought into contact with the poultry 11 before these reach the channel 13. For this, the rotational bodies 24 together with the side cheeks 14, 15 are adjustable for example in direction H (see FIG. 1). In other embodiments, the rotational bodies 24 may also be configured adjustable relative to the side cheeks 14, 15. For the case that only a single rotational body 24 forms the means 17 for active support, which is then arranged only on one side of the transport path, optionally a counterhold may be provided on the opposite side of the transport path and for example grip the poultry 11 itself or e.g. the shackle 18. The number and positioning of the rotational bodies 24 forming the means 17 for active support may depend on the size of the force to be applied.

The rotational bodies 24 may be driven by means of drive means (not shown) about rotation axes R oriented vertically and/or horizontally. In FIG. 1, both variants are shown. FIGS. 3 and 4 show further embodiments with a vertically oriented rotation axis R. For greater clarity in said figures, only the rotational bodies 24 on one side of the channel 13 are shown. Evidently the rotational bodies 24 are arranged on both sides, preferably symmetrically on both sides of the transport path. In FIG. 4 e.g. two rotational bodies 24 are arranged on each side of the channel 13, namely in the embodiment shown one rotational body 24 with a vertically oriented rotation axis R and one rotational body 24 with a horizontally oriented rotation axis R. It is evident from FIGS. 5 to 7 that the rotation axes R may also have angles between the vertical and horizontal orientations. The rotation axes R may be tilted in different directions e.g. depending on the type of product to be processed or the size of the poultry 11. The rotation axis R may e.g. be oriented parallel to the transport direction and tilted downwards. The rotation axis R may furthermore be tilted downwards and towards or away from the transport path. Other tilts and orientations are also possible.

The rotational body 24 in the embodiment shown has optionally a cylindrical form or a conical form. Other embodiments of the rotational body 24 are however also suitable, for example triangular or rectangular or pyramidal, or convex or concave bodies. In particular also asymmetrical rotational bodies 24 may be used. Instead of the rotational bodies 24, other actively driven insertion aids e.g. pivotable flaps, paddles or similar, may be used. All rotational bodies 24, irrespective of shape and orientation, have flexible push elements 25 preferably in the region of their casing surface, such that the poultry birds 11 can be gripped individually in succession firstly by rotation of the rotational bodies 24 and secondly by the push elements 25, and pushed into the channel 13 between the defeathering heads 21. These push elements 25 in the embodiment shown are fingers 26, similar to the fingers 22 of the defeathering heads 21. The number and arrangement and orientation of the fingers 26 may vary. A spiral and/or tilted and/or worm-screw arrangement and orientation is particularly preferred. The fingers 26 may however also be distributed evenly over the casing surface. Different variants of the rotational body 24 are shown in FIGS. 8 a) to 8 f), namely e.g. rollers, drums etc. which have fingers 26 on their casing surface. Instead of the fingers 26, studs or protrusions or other surface structures suitable for engagement in the feathers of the poultry 11 may be formed. The configuration of the push elements 25 as e.g. soft or hard fingers 26 may influence the size of the force to be applied.

The arrangement and orientation of the fingers 26 and their mutual spacing may correspond to the transport speed of the shackles 18 or poultry 11 suspended therefrom. Preferably the drive speed in the transport direction T of the means 17 for active support of entry of the poultry 11 between the two side cheeks 14, 15 is the same as or greater than the drive speed of the transport means 12. The drive speeds of the two rotational bodies 24 of one means 17 may be the same or they may also be different on opposing sides. The drive speed of each rotational body 24 may be controllable depending on the drive speed of the transport means 12. In an exemplary embodiment, the drive means of the transport means 12 may drive the or each rotational body 24 dependently or in synchrony, e.g. via a worm gear. In preferred embodiments, the means 17 for active support of entry of the poultry 11 between the two side cheeks 14, 15 and the defeathering means 16 arranged thereon may be controllable independently of the transport means 12. This does not exclude but expressly includes the possibility of guaranteeing synchronous operation of the rotational bodies 24 and transport means 12. In other words, the rotation speed of the rotational bodies 24 and the drive speed of the transport means 12 may be matched to each other, namely synchronised. However a totally independent operation of the rotational bodies 24 firstly and the transport means 12 secondly is also ensured.

The principle of the method according to the invention is explained below with reference to the drawing:

The poultry 11 may be suspended with their feet or legs e.g. in the shackles 18 of the transport means 12, manually or mechanically. Using the conveyor means 19, the poultry 11 are then moved in the transport direction T, preferably continuously. The poultry 11, freely hanging downwards, are transported in the transport direction T along a transport path. On transport through the channel 13, during transport of the poultry 11, the poultry 11 are defeathered by the defeathering means 16 arranged on the insides of the side cheeks 14, 15, in that the defeathering means 16 come into contact with the poultry 11 on transport of the poultry 11 through the channel 13.

According to the invention, on entry between the two side cheeks 14, 15 and the defeathering means 16 arranged thereon, each poultry bird 11 is actively supported by a means 17 located stationarily in the inlet region E of the poultry 11 into the channel 13. The support may take place by the application of a force component on the poultry 11 in the transport direction T and/or directed vertically downwards. The force component may be applied to the poultry 11 from one side of the poultry 11 or from both sides.

In the embodiment according to FIG. 5, the rotational bodies 24 are configured conical and have rubber fingers as push elements 25. The rubber fingers have a mutual spacing corresponding to the spacing of the shackles 18 and are arranged in the form of a worm screw. The rotational bodies 24 are driven such that they exert both a force component in the transport direction T and a force component directed vertically downwards. The embodiments in FIGS. 6 and 7 also have a tilt of the rotational bodies 24, which leads to a force component in the transport direction T and directed vertically downwards. In said embodiments, the rotation axes R are oriented horizontally or slightly tilted relative to the horizontal orientation.

In the embodiment in FIG. 3, the rotation axis R is oriented vertically. The worm screw-like arrangement of the rubber fingers again leads to a force component being generated in the transport direction T and directed vertically downwards. In the embodiment according to FIG. 4, the functionality is divided. By means of the first rotational body 24 in the transport direction T, because of the horizontally oriented rotation axis R and the regular arrangement of the rubber fingers, exclusively a force component is generated which is directed vertically downwards. By means of the next rotational body 24 on the same side in the transport direction T, because of the vertically oriented rotation axis R and the regular arrangement of the rubber fingers, exclusively a force component is generated in the transport direction T.

The invention claimed is:

1. An apparatus configured and designed for automatic defeathering of slaughtered poultry, comprising:
   a transport means configured and designed for freely hanging transport of poultry suspended from their feet, in the transport direction along a transport path, and
   two side cheeks spaced apart and arranged on opposite sides of the transport path and forming a channel, which on their insides facing each other and turned towards the transport path each have means for defeathering the poultry transported through the channel, wherein the defeathering means can be brought into contact with the poultry to be defeathered; and
   stationary means for active support of entry of the poultry between the two side cheeks and the defeathering means arranged thereon, which is arranged in the inlet region of the poultry into the channel.

2. The apparatus according to claim 1, wherein the means for active support of entry of the poultry between the two side cheeks is configured and designed to apply a mechanical force component in the transport direction of the poultry.

3. The apparatus according to claim 1, wherein the means for active support of entry of the poultry between the two side cheeks is configured and designed to apply a vertically downwardly directed force component.

4. The apparatus according to claim 1, wherein the side cheeks are arranged and oriented parallel to each other throughout, and on each of their insides are mounted several stationary defeathering heads which can be driven in rotation as defeathering means.

5. The apparatus according to claim 1, wherein the means for active support of entry of the poultry between the two side cheeks comprises at least two rotational bodies which can be driven in rotation and are arranged on opposite sides of the transport path.

6. The apparatus according to claim 5, wherein the rotational bodies can be driven about rotation axes oriented vertically and/or horizontally.

7. The apparatus according to claim 5, wherein the rotational bodies have either a cylindrical form or a conical form.

8. The apparatus according to claim 5, wherein all rotational bodies in the region of their casing surface have flexible push elements such that the poultry birds can be gripped individually in succession, firstly by rotation of the rotational bodies and secondly by the push elements, and pushed into the channel between the defeathering heads.

9. The apparatus according to claim 1, wherein the drive speed in the transport direction of the means for active support of entry of the poultry between the two side cheeks is the same as or greater than the drive speed of the transport means.

10. The apparatus according to claim 1, wherein the means for active support of entry of the poultry between the two side cheeks can be controlled independently of the transport means.

11. A method for automatic defeathering of slaughtered poultry, comprising the steps:

transport of the poultry suspended from their feet and hanging freely downwards, in the transport direction along a transport path by a transport means, defeathering of the poultry during transport of the poultry along a channel formed by two side cheeks spaced apart and arranged on opposite sides of the transport path, by a defeathering means arranged on the insides of the transport side cheeks, in that the defeathering means come into contact with the poultry on transport of the poultry through the channel, wherein on entry between the two side cheeks and the defeathering means arranged thereon, each poultry bird is actively supported by a means located stationarily in the inlet region E of the poultry into the channel.

12. The method according to claim 11, wherein on entry between the two side cheeks, the poultry are actively supported in that the means apply a mechanical force component to the poultry in the transport direction of the poultry and/or directed vertically downwards.

13. The method according to claim 11, wherein the means for active support of entry of the poultry between the two side cheeks is controlled independently of the transport means.

* * * * *